(12) United States Patent
Dymetman et al.

(10) Patent No.: US 8,838,415 B2
(45) Date of Patent: Sep. 16, 2014

(54) REJECTION SAMPLING OF A COMPLEX DISTRIBUTION INCLUDING BOUND AND PROPOSAL DISTRIBUTION REFINEMENT

(75) Inventors: Marc Dymetman, Grenoble (FR); Guillaume M. Bouchard, Crolles (FR)

(73) Assignee: Xerox Corporation, Norwalk, CT (US)

( * ) Notice: Subject to any disclaimer, the term of this patent is extended or adjusted under 35 U.S.C. 154(b) by 433 days.

(21) Appl. No.: 13/273,448

(22) Filed: Oct. 14, 2011

(65) Prior Publication Data

US 2013/0096877 A1 Apr. 18, 2013

(51) Int. Cl.
*G06F 17/27* (2006.01)
*G06F 17/18* (2006.01)

(52) U.S. Cl.
CPC .......... *G06F 17/18* (2013.01); *G06F 17/2715* (2013.01)
USPC .......................................... 702/181

(58) Field of Classification Search
CPC .................................. G06F 17/2715
USPC .......................................... 702/181
See application file for complete search history.

(56) References Cited

U.S. PATENT DOCUMENTS

2012/0259807 A1* 10/2012 Dymetman ................ 706/50

OTHER PUBLICATIONS

"A Brief Introduction to Graphical Models and Bayesian Networks", Retrieved from Internet on Oct. 14, 2011; http://www.cs.berkeley.edu/~murphyk/Bayes/bayes.html, pp. 1-19.

Gilks, et al. "Adaptive Rejection Sampling for Gibbs Sampling", Appl. Statist. (1992), 41, No. 2, pp. 337-348.
Gorur, et al. "Concave Convex Adaptive Rejection Sampling", Gatsby Computational Neuroscience Unit, pp. 1-16.
Hart, et al. "A formal basis for the Heuristic Determination of Minimum Cost Paths", IEEE Transactions of Systems Science and Cybernetics, vol. SSC-4, No. 2, Jul. 196, pp. 100-107.
Jordan, et al. "An introduction to Variational Methods for Graphical Models", Machine Learning, 1999, 37, pp. 183-233.
Propp, et al. "Exact Sampling with Coupled Markov Chains and Applications to Statistical Mechanics", Department of Mathematics, Massachusetts Institute of Technology, Jul. 16, 1996, 1-27.
Wainwright, et al. "Tree-reweighted belief propogation algorithms and approximate ML estimation by pseudo-moment matching", 2003, pp. 1-8.

(Continued)

*Primary Examiner* — Bryan Bui
(74) *Attorney, Agent, or Firm* — Fay Sharpe LLP (57) ABSTRACT

Iterative rejection sampling is performed on a domain in accordance with a target distribution. The domain is partitioned to define a partition comprising partition elements, and each iteration of the rejection sampling includes selecting a partition element from the partition in accordance with partition element selection probabilities. A sample of the domain is acquired in the selected partition element according to a normalized proposal distribution that is associated with and normalized over the selected partition element. The acquired sample is accepted or rejected based on the target distribution and a bound associated with the selected partition element. During the iterative rejection sampling, the partition is adapted by replacing a partition element of the partition with two or more split partition elements, associating bounds with the split partition elements, and computing partition element selection probabilities for the split partition elements.

24 Claims, 7 Drawing Sheets

(56) References Cited

OTHER PUBLICATIONS

Wetherell. "Probabilistic Languages: A Review and Some Open Questions", Computing Surveys, vol. 12, No. 4, Dec. 1980, pp. 1-19.
Yedidia, et al. "Generalized Belief Propagation", 2001, pp. 1-7.
Mansingha, et al. "Exact and Approximate Sampling by Systematic Stochastic Search", 2009, pp. 1-8.
Görür, et al., "Concave convex adaptive rejection sampling," Technical report, Gatsby Computational Neuroscience Unit, pp. 1-16 (2008).
Hart, et al., "A formal basis for the heuristic determination of minimum cost paths. IEEE Transactions On Systems Science and Cybernetics," 4(2), pp. 100-107 (1968).
Schofield, "Fitting maximum-entropy models on large sample spaces," Ph.D. Thesis submitted to the Department of Computing, Imperial College London, pp. 1-137 (2007).
Snyder, "Unsupervised Multilingual Learning," submitted to the Department of Electrical Engineering and Computer Science, pp. 1-242 (2010).
Andrieu, et al., "A tutorial on adaptive MCMC," Statistics and Computing, vol. 18, pp. 343-373 (2008).
Chiang, "Hierarchical Phrase-Based Translation," Association for Computational Linguistics, vol. 33, No. 2, pp. 201-228 (2007).

* cited by examiner

REJECTION SAMPLING OF A COMPLEX DISTRIBUTION INCLUDING BOUND AND PROPOSAL DISTRIBUTION REFINEMENT

BACKGROUND

The following relates to the statistical sampling arts and related arts, and to arts employing statistical sampling.

A diverse range of problems can be formulated in terms of sampling of a space or domain (represented herein without loss of generality as X a sample of which may be denoted as x) in accordance with a target distribution, which is represented herein without loss of generality as p(x), which may or may not be normalized. For example, many structured learning problems can be naturally cast in terms of decision sequences that describe a structured object x, which is associated with an unnormalized probability or distribution p(x). In some such learning problems, p(x) is the exponential of a real-valued "energy" function, which is analogous to the "value" function in optimization problems. In such situations, both inference and learning give a central role to procedures that are able to produce samples for x that follow the normalized probability distribution associated with p(x).

A known approach for performing such sampling is a technique called rejection sampling. In this approach, sampling is performed in accordance with a proposal distribution, which is represented herein without loss of generality as $\bar{q}(x)$, where the overbar indicates a normalized distribution. Rejection sampling is premised upon finding an upper bound β for the "density ratios" $\rho(x) = p(x)/\bar{q}(x)$ over the whole of the sampling space X, to sample $x \sim \bar{q}$ (that is, sample x according to $\bar{q}$), and to accept x with probability $p(x)/(\beta \bar{q}(x))$. The average acceptance rate γ is equal to $p(X)/\beta$ (which is always ≤1), where p(X) is the total measure of X relative to p (the partition function of p). Efficient sampling is obtained by employing a proposal distribution $\bar{q}(x)$ that is a good approximation of the normalized target distribution $\bar{p}(X)$, and so the choice of $\bar{q}(x)$ is of substantial concern.

However, in practice it can be difficult to obtain a proposal distribution $\bar{q}(x)$ that closely approximates $\bar{q}(X)$. If $\bar{q}(x)$ is a poor approximation of p(x) then many samples obtained in accordance with the proposal distribution $\bar{q}(x)$ are rejected by the target distribution p(x), leading to poor sampling efficiency.

In adaptive rejection sampling (ARS), the rejected samples are used to improve the proposal distribution. ARS assumes that the target distribution p(x) is concave, in which case a tangent line at any given point on the target distribution is guaranteed to define an upper bound. This concavity aspect is used in ARS to refine the proposal distribution $\bar{q}(x)$ based on rejected samples. See Gilks et al., "Adaptive Rejection Sampling for Gibbs Sampling", App. Statist. vol. 41 pages 337-48 (1992).

ARS is applicable to log-concave distributions in which the logarithm of the target density function p(X) is concave. Görür et al., "Concave Convex Adaptive Rejection Sampling", Technical Report, Gatsby Computational Neuroscience Unit (2008) (hereinafter "Görür et al."). Görür et al. sets forth an improved ARS that is applicable to distributions whose log densities can be expressed as a sum of concave and convex functions, which expands the scope of applicability of ARS. Nonetheless, even with this improvement the ARS technique is generally limited to a target distribution p(X) that is continuous in one dimension. This is a consequence of ARS relying upon piecewise linear upper bounds that are refined based on rejected samples and that are assured of being upper bounds on account of the continuous curvature between the end points. ARS techniques are therefore difficult or impossible to adapt to sampling of a complex target distribution p(X), such as a multi-dimensional target distribution, a discrete target distribution, discrete multi-dimensional target distribution, a highly discontinuous target distribution, and so forth.

BRIEF DESCRIPTION

In some illustrative embodiments disclosed as illustrative examples herein, a method comprises: performing iterative rejection sampling on a domain in accordance with a target distribution wherein the domain is partitioned to define a partition comprising partition elements and wherein each iteration of the rejection sampling includes selecting a partition element from the partition in accordance with partition element selection probabilities, acquiring a sample of the domain in the selected partition element according to a normalized proposal distribution that is associated with and normalized over the selected partition element, and accepting or rejecting the acquired sample based on the target distribution and a bound associated with the selected partition element; and, during the iterative rejection sampling, adapting the partition by replacing a partition element of the partition with two or more split partition elements, associating bounds with the split partition elements, and computing partition element selection probabilities for the split partition elements. The performing of iterative rejection sampling and the adapting of the partition may suitably be performed by an electronic processing device.

In some illustrative embodiments disclosed as illustrative examples herein, a non-transitory storage medium stores instructions executable by an electronic processing device to perform a method including performing iterative rejection sampling of a domain in accordance with a target distribution p wherein the domain is partitioned into a partition comprising partition elements $Y_i$ each having an associated selection probability $\pi_i$ and an associated normalized proposal distribution $\bar{q}_{Y_i}$ that is normalized over the partition element $Y_i$ and an associated bound $Q_{Y_i} = B_{Y_i}$ where $B_{Y_i}$ is a nonnegative scaling factor. (As used herein, the term "bound" may denote a bound that is a number or, as in the case of $Q_{Y_i} = B_{Y_i} \bar{q}_{Y_i}$, a bound that is a measure, that is, a bounding measure that is not a simple number). At least one iteration of the iterative rejection sampling is performed by selecting a partition element $Y_{sel}$ of the partition in accordance with the selection probabilities $\pi_i$, obtaining a sample x of the domain in the selected partition element $Y_{sel}$ in accordance with the normalized proposal distribution $\bar{q}_{Y_{sel}}$ associated with the selected partition element $Y_{sel}$, and accepting or rejecting the sample x based on an acceptance criterion $$u \le \frac{dp}{dQ_{Y_{sel}}}(x)$$

wherein (i) accepting the sample comprises adding the sample to a set of accepted samples and (ii) rejecting the sample comprises replacing the selected partition element $Y_{sel}$ with split partition elements $A_j$, j=1, . . . , N where N≥2 and $Y_{sel} = \cup_{j=1}^{N} A_j$ where ∪ is the union symbol.

In some illustrative embodiments disclosed as illustrative examples herein, an apparatus comprises an electronic processing device configured to: partition a domain into one or more partition elements $Y_i$ each having an associated selection probability $\pi_i$ and an associated normalized proposal distribution $\bar{q}_{Y_i}$ that is normalized over the partition element $Y_i$ and an associated bound $Q_{Y_i} = B_{Y_i} \bar{q}_{Y_i}$, where $B_{Y_i}$ is a nonnegative scaling factor; iteratively sample the domain in accordance with a target distribution p wherein each iteration includes selecting a partition element $Y_{sel}$ in accordance with the selection probabilities $\pi_i$, acquiring a sample x from the domain within the selected partition element $Y_{sel}$ in accordance with the normalized proposal distribution $\bar{q}_{Y_{sel}}$ associated with the selected partition element $Y_{sel}$, and accepting or rejecting the acquired sample x based on the target distribution p and the bound $Q_{Y_{sel}} = B_{Y_{sel}} \bar{q}_{Y_{sel}}$ associated with the selected partition element $Y_{sel}$; and, during the iterative sampling, replace a partition element $Y_r$ with split partition elements $A_j$, $j=1, \ldots, N$ where $N \geq 2$ and $Y_r = \cup_{j=1}^{N} A_j$, the iterative sampling continuing after the replacement.

DETAILED DESCRIPTION

In the following, the terms "optimization", "minimization", and similar phraseology are to be broadly construed as one of ordinary skill in the art would understand these terms. For example, these terms are not to be construed as being limited to the absolute global optimum value, absolute global minimum, or so forth. For example, minimization of a function may employ an iterative minimization algorithm that terminates at a stopping criterion before an absolute minimum is reached. It is also contemplated for the optimum or minimum value to be a local optimum or local minimum value.

Figure 1:
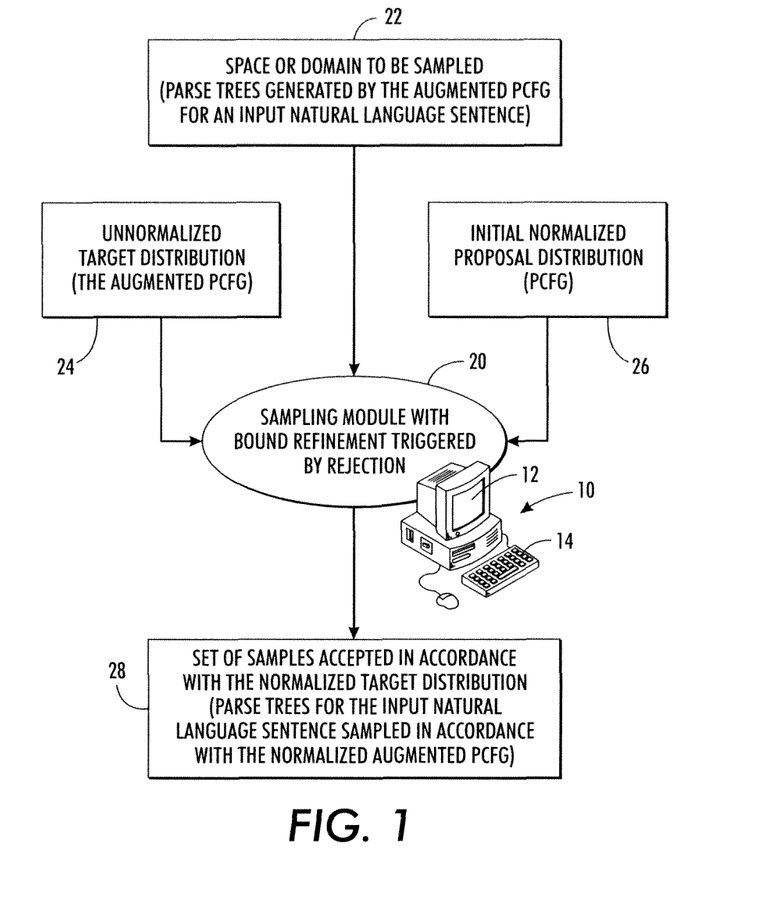
FIG. 1 diagrammatically shows a rejection sampling system employing an adaptive rejection sampling technique as disclosed herein.

With reference to FIG. 1, a rejection sampling system employing an adaptive rejection sampling technique as disclosed herein is embodied as an electronic processing device such as an illustrative computer 10 or other digital processing device that includes a digital processor (not shown). For example, the electronic processing device may comprise the illustrative computer 10, or a network-based server, or a mobile device such as a personal data assistant (PDA), smartphone, tablet computer, or so forth. The digital processor can be variously embodied, such as by a single-core processor, a dual-core processor (or more generally by a multiple-core processor), a digital processor and cooperating math coprocessor, a digital controller, or so forth. The illustrative computer 10 is a desktop or laptop computer including a display 12 and a keyboard 14. Other interfacing devices, such as a second monitor, a mouse or trackball, or so forth can also be included. On the other hand, the illustrated computer 10 can be replaced by another digital processing device such as a network server having only network interfacing (for example, Internet or local area network (LAN) interfacing), or so forth.

The electronic processing device 10 embodies a sampling module 20 that performs adaptive rejection sampling using techniques disclosed herein. These techniques are disclosed herein with illustrative reference to a natural language parsing application in which a probabilistic context-free grammar (PCFG) is augmented by transversal constraints. All configurations x in the space to be sampled correspond to possible parse trees of the PCFG, and for a given input natural language sentence the PCFG assigns a probability to each configuration x (that is, to each possible parse tree for the sentence). This probability is the product of the conditional probabilities of the rules used for producing the parse tree x. The PCFG is assumed to be normalized in that the sum of the probabilities of all finite parse trees is unity.

Applying the PCFG by itself is straightforward. However, if the PCFG is augmented by some transversal constraint (or constraints), then evaluation is much more difficult. For example, consider an augmentation of the PCFG in which the probability p(x) of a finite parse tree x is defined as the product of (1) the output of the PCFG and (2) a transversal constraint term f(x) which lies in the interval [0,1]. Such a transversal term may represent various constraints upon the parsing. By way of illustrative example, f(x) may provide (probabilistic) enforcement of a certain quality of linguistic agreement between different words in the derivation. As a specific example, the transversal constraint f(x) may bias against (i.e., reduce the probability of) a parse tree in which a singular subject is associated with a plural verb. The transversal constraint f(x) does not completely forbid such an association, but reduces the probability of parse trees including such an association. This is merely an illustrative example, and more generally the transversal constraint f(x) can provide various probabilistic constraints that tune, adapt, or otherwise improve the augmented PCFG for various applications. In particular, since the augmented PCFG is constructed as a product of the output of the PCFG and the transversal constraint, it follows that the transversal constraint f(x) can comprise a product of two or more transversal constraints each representing a different constraint upon the parsing.

Unlike the "pure" PCFG, the augmented PCFG is substantially more difficult to sample from. One difficulty is that, although the PCFG is known to be normalized, there is no guarantee that the augmented PCFG will be normalized (indeed, it most likely will not be normalized). As a result, the computed product of the output of the PCFG and the transversal constraint is not a true probability value. Moreover, computing a normalization factor is typically difficult or impossible due to the very large number of possible parsing trees that can be generated by the augmented PCFG for a given input sentence.

With continuing reference to FIG. 1, in an illustrative embodiment an augmented PCFG is implemented using adaptive rejection sampling techniques disclosed herein. Blocks of FIG. 1 representing quantities, elements, structures or the like are labeled with a general term applicable for any sampling application and, below the general term, with a parenthetical label setting forth the quantity, element, structure, or so forth in the context of the illustrative augmented PCFG application. The sampling module 20 operates on a space or domain 22 to be sampled, which is denoted herein without loss of generality as X. The domain 22 does not have any limitations in terms of continuity, dimensionality, or differentiability. For example, the domain 22 may be one-dimensional, two-dimensional, or higher-dimensional. The domain 22 may be continuous or discrete, or may be continuous with some discontinuities, or so forth. In the illustrative augmented PCFG evaluation application, the domain 22 comprises all possible parse trees that can be generated by the PCFG with transversal constraints (i.e., the augmented PCFG) for a given input natural language sentence.

The sampling module 20 performs adaptive iterative rejection sampling on the domain 22 in accordance with a target distribution 24, which is denoted herein without loss of generality as p(x). The target distribution 24 is not, in general, normalized. In the illustrative application the target distribution 24 is the augmented PCFG, which is most likely not a normalized distribution.

The sampling module 20 also receives an initial proposal distribution 26 for use in the rejection sampling, which is denoted herein without loss of generality as $\bar{q}_X(x)$. The initial proposal distribution $\bar{q}_X(x)$ is normalized over the domain X 22. Notationally, the overbar indicates a normalized distribution while the subscript "X" indicates the normalization is over the entire domain X. The disclosed rejection sampling techniques are adaptive in that the proposal distribution is adjusted or "adapted" over the course of the sampling—hence the "initial" proposal distribution 26. In some embodiments of the adaptive rejection sampling disclosed herein the adapted proposal distributions are based on the initial proposal distribution 26. Accordingly, the initial (normalized) proposal distribution 26 is also referred to herein as reference (normalized) proposal distribution 26. The initial or reference proposal distribution 26 is also sometimes denoted herein without the subscript "X", that is, $\bar{q}(x) \equiv \bar{q}_X(x)$.

In the illustrative application of sampling an augmented PCFG, a suitable choice for the reference proposal distribution $\bar{q}(x)$ 26 is the "pure" (that is, not augmented) PCFG, which is a normalized distribution that is expected to be a reasonable approximation of the augmented PCFG.

The sampling module 20 performs adaptive iterative rejection sampling of the domain X 22 in accordance with the unnormalized target distribution p(x) 24 and initially using the normalized (reference) proposal distribution $\bar{q}(x)$ 26 to generate a set of samples 28 that are accepted in accordance with the normalized target distribution $\bar{p}_X(x) \equiv \bar{p}(x)$ (where, again, the overbar indicates normalization over the domain 22 as indicated by the subscript "X" which is sometimes omitted herein for notational simplicity). In the case of the illustrative application of augmented PCFG sampling, the output 28 is a set of parse trees for the input natural language sentence sampled in accordance with the normalized augmented PCFG.

Figure 2:
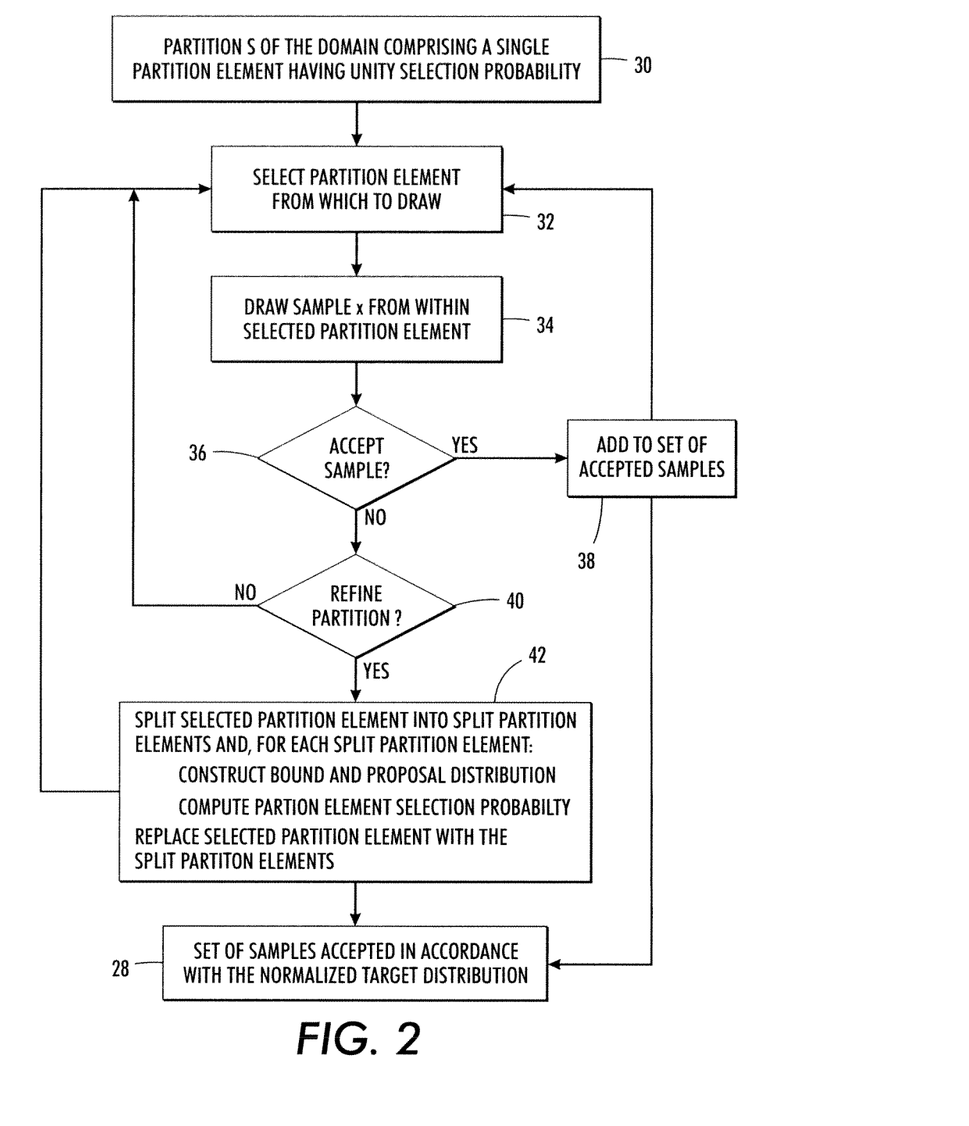
FIG. 2 diagrammatically shows the sampling module of the rejection sampling system of FIG. 1.

With continuing reference to FIG. 1 and with further reference to FIG. 2, the sampling module 20 employs rejection sampling in which the domain 22 is partitioned into partition elements of a partition in an operation 30, and a proposal distribution and bound is defined for each partition element. In some embodiments, the operation 30 initializes the partition with a single partition element that spans the entire domain 22; however, it is also contemplated to initialize the partition with two, three, or more partition elements. Without loss of generality, the partition is denoted S, the number of partition elements in the partition S is denoted |S|, and the partition elements of the partition S are denoted as $Y_i$, i= 1, . . . , |S|. Each partition $Y_i$ has an associated partition element selection probability denoted $\pi_i$ which is normalized (that is, $\Sigma_{i=1}^{|S|} \pi_i = 1$). Each partition element $Y_i$ also has a normalized proposal distribution $\bar{q}_{Y_i}$ that is normalized over the partition element $Y_i$, and an upper bound $Q_{Y_i}$ such that $p(x) \leq Q_{Y_i}$ over the entire partition element $Y_i$. In some embodiments disclosed herein, the bound $Q_{Y_i}$ is proportional to the normalized proposal distribution $\bar{q}_{Y_i}$, that is, $Q_{Y_i} = B_{Y_i} \bar{q}_{Y_i}$ where $B_{Y_i}$ is a nonnegative scaling factor associated with the partition element $Y_i$. The bound and proposal distribution are determined for the initial partition element(s) formed by the initialization operation 30 based on the specific sampling problem. For the illustrative augmented PCFG sampling, the entire domain 22 is spanned by a single initial partition element having as its initial normalized proposal distribution the reference normalized distribution $\bar{q}(x) \equiv \bar{q}_X(x)$ 26 which is the PCFG. As explained elsewhere herein, upper bound $Q_{Y_i} = B_{Y_i} \bar{q}_{Y_i}$ for this single partition element is suitably set to the transversal constraint $f(x) = p(x)/\bar{q}(x)$.

An iteration of the rejection sampling includes an operation 32 in which a partition element is selected from which to draw the sample. This selected partition element is denoted herein as $Y_{sel}$. In an operation 34 a sample (denoted x) is drawn from the selected partition $Y_{sel}$. In an operation 36, this sample x is accepted or rejected based on the target distribution p(x) and the bound $Q_{Y_{sel}}$ associated with the selected partition element $Y_{sel}$. If the sample x is accepted, then in an operation 38 the sample is added to the set of samples 28 that are accepted in accordance with the normalized target distribution $\bar{p}_X(x) \equiv \bar{p}(x)$, and process flow returns to the operation 32 to perform another sampling iteration. It will be appreciated that the sampling iteration 32, 34, 36, 38 is a conventional rejection sampling iteration, except for the addition of the partition element selection operation 32 and the drawing of the sample from the selected partition element $Y_{sel}$ rather than from the entire domain 22.

With continuing reference to FIG. 2, the adaptive aspect of the adaptive rejection sampling disclosed herein comprises adapting the partition by replacing a partition element of the partition with two or more split partition elements, associating bounds with the split partition elements, and computing partition element selection probabilities for the split partition elements. Toward this end, if the sample x is rejected in the acceptance-or-rejection decision 36, then a further decision 40 is made as to whether the partition should be refined. If no partition refinement is to be performed, then process flow returns to the operation 32 to perform another sampling iteration. On the other hand, if the decision 40 is to refine the partition, then in a refinement operation 42 the selected partition $Y_{sel}$ is split into two or more split partition elements (denoted herein as split partition elements $A_j$, j=1, . . . , N where N≥2 and $Y_{sel} = \cup_{j=1}^{N} A_j$). The refinement operation 42 also includes constructing for each split partition element $A_j$ the following associated parameters: the normalized proposal distribution $\bar{q}_{A_j}$; the bound $Q_{A_j}$ (in some embodiments $Q_{A_j} = B_{A_j} \bar{q}_{A_j}$ where $B_{A_j}$ is a nonnegative scaling factor associated with the split partition element $A_j$); and the partition element selection probability $\pi_j$. The refinement operation 42 replaces the selected partition element $Y_{sel}$ with the two (or more) split partition elements $A_j$, and so the number of partitions |S| is increased. Upon completion of the refinement operation 42, process flow returns to the operation 32 to perform another sampling iteration.

Figure 3:
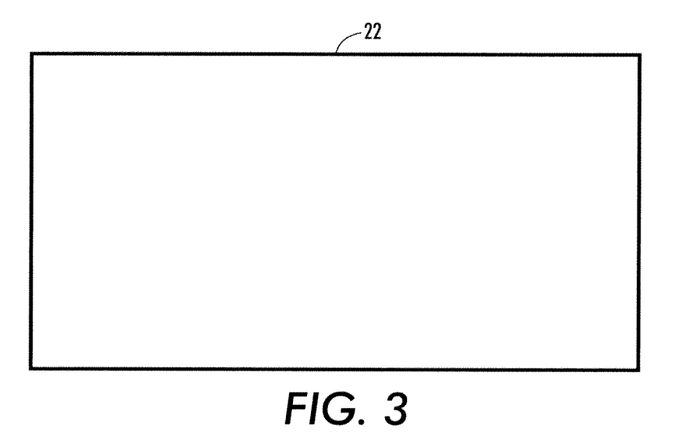
FIGS. 3-6 diagrammatically show refinement of the sampling domain during the rejection sampling.
Figure 4:
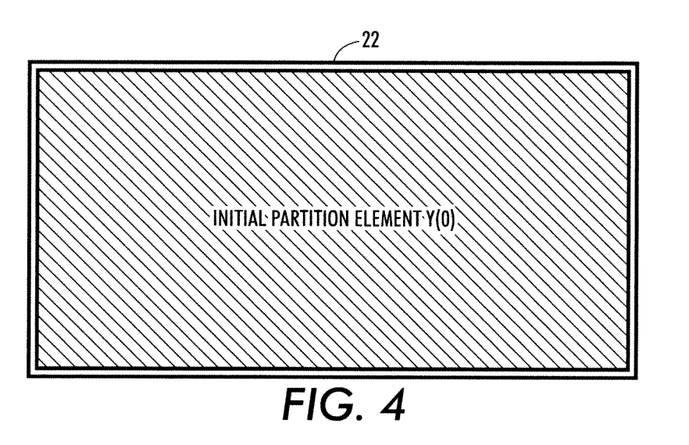
Figure 5:
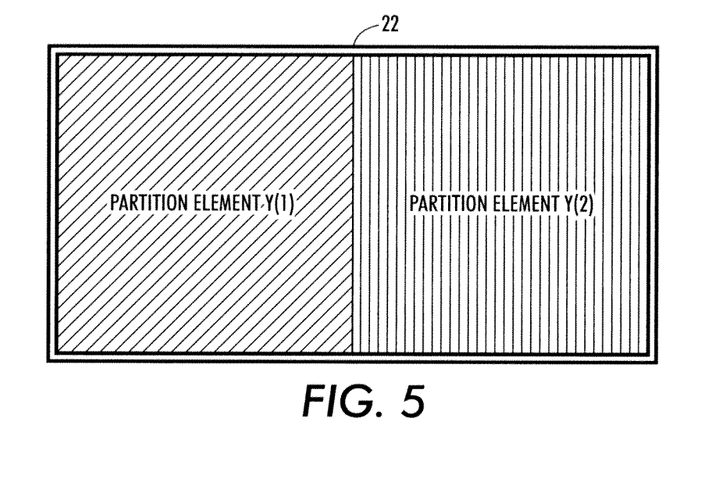
Figure 6:
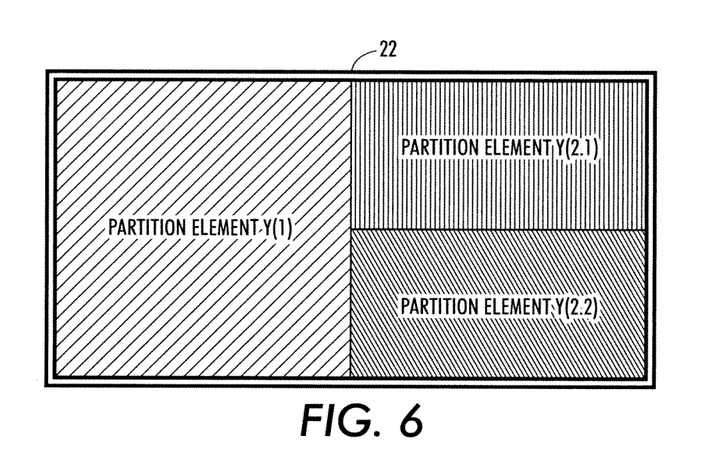

With reference to FIGS. 3-6, the adaptation of the partition is illustrated diagrammatically. FIG. 3 diagrammatically shows the domain 22. While FIG. 3 shows a continuous two-dimensional rectangular domain, it is to be understood that the domain can be continuous or discrete, can include discontinuities, or have other complexity. FIG. 4 shows the result of the operation 30 in the case where the partition is initialized to have a single partition element labeled Y(0) in FIG. 4. This singular partition element Y(0) has unity selection probability (e.g., $\pi_0 = 1$) since in the initial iteration the operation 32 must select Y(0) as it is the only available partition element. The initial singular partition element Y(0) also has a normalized proposal distribution $\bar{q} \equiv \bar{q}_X$ corresponding to the initial or reference proposal distribution 26, and an upper bound $Q_0$. FIG. 5 shows the first split operation (that is, the first iteration of the refinement operation 42 of FIG. 2), in which the initial partition element Y(0) of FIG. 4 is replaced by two split partition elements labeled Y(1) and Y(2), respectively, in FIG. 5. The split partitions elements Y(1), Y(2) have respective partition element selection probabilities $\pi_1$ and $\pi_2$; respective normalized proposal distributions $\bar{q}_1$ and $\bar{q}_2$; and respective bounds $Q_1$ and $Q_2$. FIG. 6 shows the second split operation (that is, the second iteration of the refinement operation 42 of FIG. 2). This second iteration of the refinement operation 42 was triggered by rejection of a sample selected from the partition Y(2), and so the refinement operation 42 replaces Y(2) by split partitions Y(2.1) and Y(2.2) which have respective partition element selection probabilities $\pi_{2.1}$ and $\pi_{2.2}$; respective normalized proposal distributions $\bar{q}_{2.1}$ and $\bar{q}_{2.2}$; and respective bounds $Q_{2.1}$ and $Q_{2.2}$. It will be appreciated that such iterative splitting can continue indefinitely, or until some adaptation termination criterion is satisfied (after which the refine partition decision 40 would be programmed to always output "no" so that no further iterations of the refinement operation 42 would be performed).

Having provided an overview of embodiments of the adaptive iterative rejection sampling approaches disclosed herein with reference to FIGS. 1-6, some additional examples are now set forth.

The disclosed adaptive rejection sampling approaches are based on the following observation. It is desired to sample from target distribution $\bar{p}$ which is the normalized version of p, and some proposal distribution $\bar{q}$ over X is available from which it is known how to sample directly. Rejection sampling is based on the ability to find an upper bound p for the density ratio' $\rho(x) \equiv p(x)/\bar{q}(x)$ over the whole of X, to sample $x \sim \bar{q}$, and to accept x with probability $p(x)/(\beta \bar{q}(x))$. The average acceptance rate $\gamma$ is equal to $p(X)/\beta$ (which is always $\leq 1$), where $p(X)$ is the total measure of X relative to p (the partition function of p), and therefore the lower $\beta$ is (and therefore the closer to $p(X)$), the more efficient the sampling procedure.

The adaptive adaptation approaches disclosed herein split the space or domain X 22 into two (or optionally more) disjoint subsets $Y_1, Y_2$; for many problems it is straightforward to find nonnegative numbers $\beta_1 < \beta$ and $\beta_2 < \beta$ subject to $\beta_i$ being an upper bound for the density ratio $\rho(x)$ over $Y_i$, $i=1,2$. Considering $\beta' \equiv \beta_1 \bar{q}(Y_1) + \beta_2 \bar{q}(Y_2)$, which is smaller than $\beta$, an adapted proposal distribution $\bar{q}'(x)$ can be defined by first sampling i according to the probability vector $$\frac{1}{\beta'}(\beta_1 \bar{q}(Y_1), \beta_2 \bar{q}(Y_2)),$$

and then sampling x inside $Y_i$ with $\bar{q}(\cdot|Y_i)$. For $x \in Y_i$, it follows that $$\frac{p(x)}{\beta' \bar{q}'(x)} = \frac{p(x)}{\bar{q}(x|Y_i)\bar{q}(Y_i)\beta_i} = \frac{p(x)}{\bar{q}(x)\beta_i} \leq 1,$$

which implies that $\beta'$ is an upper bound over the whole domain X 22 for the density ratios $p(x)/\bar{q}'(x)$. Thus $\bar{q}'$ can be used as the basis for a new rejection sampler, but this time with a smaller bound $\beta'$ than initially, that is, with a better average acceptance rate $p(x)/\beta'(x)$.

This splitting or partition refinement can be continued recursively as shown in FIGS. 2-6, and each time a split is performed, the overall rejection rate is decreased by some amount. As previously noted, the splitting can be terminated at some point on the basis of a suitable refinement termination criterion, after which termination no further iterations of partition refinement will be performed. One suitable criterion for stopping the splitting is that the observed acceptance rate is larger than a predefined threshold. At this point further splitting is terminated, and the rejection sampling continues using the refined partition with the observed level of acceptance rate generally continuing to be observed for future samples.

An advantage of rejection sampling over techniques in the Markov Chain Monte Carlo (MCMC) family of sampling techniques (e.g., Gibbs or Metropolis-Hastings sampling) is that the rejection sampling provides exact samples from the target distribution right from the start, rather than converging to exact sampling in the limit. However, rejection sampling can be inefficient in producing these samples, if the proposal distribution is a poor approximation of the target distribution. The adaptive rejection sampling approaches disclosed herein retains the property of producing exact samples, but improves efficiency through adaptation of the partition. The disclosed approach advantageously can be applied to arbitrary measurable spaces, whether discrete or continuous, without strong assumptions such as the space being Euclidian, or continuous, or differentiable, or so forth. By basing the adaptation upon refinement of partitioning of the domain, the detailed structure and characteristics of the target distribution and its domain do not impact the adaptation.

The following notation and observations are utilized and referenced in setting forth some illustrative adaptive rejection sampling embodiments. For any measures $\mu$ and $\mu'$ on the same measurable domain or space X, the comparison $\mu \leq \mu'$ is defined as $\mu(A) \leq \mu'(A)$ for $A \subset X$ any measurable subset of X. That is to say, $\mu$ is uniformly smaller than $\mu'$, or said another way, $\mu$ is uniformly dominated by $\mu'$. If $\mu \leq \mu'$ then $\mu$ is absolutely continuous relative to $\mu'$, and therefore the Radon-Nikodym derivative $$\frac{d\mu}{d\mu'}(x)$$

exists almost everywhere with respect to $\mu'$. It can be shown that $\mu \leq \mu'$ is then equivalent to the condition $$\frac{d\mu}{d\mu'}(x) \leq 1$$

almost everywhere with respect to $\mu'$. Note that if $\mu$ and $\mu'$ are discrete, then $$\frac{d\mu}{d\mu'}(x)$$

is simply the ratio of two numbers $$\frac{\mu(x)}{\mu'(x)}.$$

If $\mu$ is an arbitrary finite measure on X, then $\bar{\mu}$ is used herein to denote the probability measure associated with $\mu$, that is, the measure $$\frac{\mu}{\mu(X)}.$$

is a measure and Y is a measurable subset of X, then $\mu^{(Y)}$ is used herein to denote the restriction of $\mu$ to Y. If $\mu$ is a measure on X and γ is a non-negative number, then γμ is used herein to denote the measure μ' defined by μ'(A)=γμ(A), for A a measurable subset of X.

Given two finite measures p≤Q, and assuming that it is known how to sample from $\overline{Q}$, rejection sampling can be described as follows. A "trial" is performed by acquiring a sample x from $\overline{Q}$, and then the sample x is accepted with probability $$\frac{dp}{dQ}(x).$$

The probability for a trial to be accepted (that is, the acceptance rate) is then $$\int_X \frac{dp}{dQ}(x)d\overline{Q} = \frac{1}{Q(X)}\int_X \frac{dp}{dQ}(x)dQ = p(X)/Q(X).$$

The acceptance rate is close to unity if Q(X) is not much larger than p(X). The probability that a trial falls in the set A and is accepted is equal to $$\int_A \frac{dp}{dQ}(x)d\overline{Q} = p(A)/Q(X),$$

which implies that the probability that a trial falls in A knowing that it is accepted is equal to $$\frac{p(A)/Q(X)}{p(X)/Q(X)} = \overline{p}(A).$$

In other words, the samples produced by the algorithm are distributed according to $\overline{p}$.

The adaptive rejection sampling disclosed herein extends rejection sampling algorithm in accordance with a target distribution $\overline{p}$ by finding a decreasing sequence of adaptive proposal measures $Q_k$ such that $Q_0 \geq Q_1 \geq Q_2 \geq \ldots \geq p$. The adaptation starts from a certain measure $Q_{(0)}$ such that $p \leq Q_{(0)}$ or, equivalently, $p^{(X)} \leq Q_{(0)}^{(X)}$. Rejection sampling is initially performed based on $Q_{(0)}$. When a sample is rejected in operation 36 (FIG. 2) and the decision 40 is to refine the partition, the space or domain X 22 is split into partition elements $X_1$, $X_j$, ..., $X_m$, and refined measures $Q_{(1)}^{(X_j)}$ are computed such that $p^{(X_j)} \leq Q_{(1)}^{(X_j)} \leq Q_{(0)}^{(X_j)}$, $\forall j$, and $Q_{(1)} = \Sigma_j Q_{(1)}^{(X_j)}$ is defined. It follows that $p \leq Q_{(1)} \leq Q_{(0)}$ which means that the rejection sampler with $Q_{(1)}$ has a better acceptance rate than the one with $Q_{(0)}$. Rejection sampling continues with this new rejection sampler, and when another sample is rejected, say on a point in selected partition element $X_{sel}$, then the selected partition element $X_{sel}$ is split and a refinement $Q_{(2)}$ of $Q_{(1)}$ is computed over these splits, and so on. At any stage of the partition refinement, it may be decided to stop further refining the partition for space or domain X 22, in which case the acceptance rate no longer improves via adaptation. At any stage, the samples that are accepted by the rejection sampling are distributed according to p, i.e. exact sampling is obtained.

In some adaptive rejection sampling embodiments disclosed herein, all the measures $Q_j$ are derived from a single reference measure $Q_0 = q = \beta \overline{q}$, with $\beta \geq 0$, which implies that $$\frac{dp}{d\overline{q}}(x) \leq \beta$$

on the whole of X. Given a subset Y of X, β'≤β can be found such that $$\frac{dp}{d\overline{q}}(x) \leq \beta'$$

on Y. A measure $q'^{(Y)} = \beta'\overline{q}^{(Y)}$ can be defined for which $p^{(Y)} \leq q'^{(Y)} \leq \overline{q}^{(Y)}$.

In one embodiment, the target measure or distribution is denoted by p, and the rejection sampling is in accordance with the distribution $\overline{p}$. The notation $\overline{q}_Y$ denotes a probability measure defined on and normalized over a measurable subset (i.e., partition element) Y of the space or domain X. The notation $B_Y$ denotes a non-negative number associated with the partition element Y. A bound $q_Y = B_Y \overline{q}_Y$ is defined, and therefore $B_Y = q_Y(Y)$. If S is a partition $(Y_1, \ldots, Y_i, \ldots, Y_{|S|})$ of X, the measure over X whose restriction to each $Y_i$ is equal to $q_{Y_i}$ is denoted by $q_S = \Sigma_i q_{Y_i}$. This $q_S$ is the adaptive proposal measure used to produce trials. The following Adaptive Rejection Sampling Algorithm #1 is set forth within this framework.

---

Adaptive Rejection Sampling Algorithm #1

---

1: Accepts ← 0; Rejects ← 0
2: S ← (X)
3: π ← (1)
4: $(B_X, \overline{q}_X)$ ← BoundingPair(X)
5: while TRUE do
6:   i~π
7:   $Y_i$ = S(i)
8:   x~$\overline{q}_{Y_i}$
9:   u~U([0, 1])
10:  
   if $u \leq \frac{1}{B_{Y_i}} \frac{dp}{d\overline{q}_{Y_i}}(x)$ then
11:    Accepts ← Accepts + 1
12:    Print x
13:  else
14:    Rejects ← Rejects + 1
15:    if Refine($Y_i$, Accepts, Rejects, x) then
16:      $A_1, A_2$ ← Split($Y_i$)
17:      S ← $(Y_1, \ldots, Y_{i-1}, A_1, A_2, Y_{i+1}, \ldots, Y_{|S+1|})$
18:      $(B_{A_1}, \overline{q}_{A_1})$ ← BoundingPair($A_1$)
19:      $(B_{A_2}, \overline{q}_{A_2})$ ← BoundingPair($A_2$)
20:  
   $\alpha \leftarrow 1 - \pi_i\left(1 - \frac{B_{A_1} + B_{A_2}}{B_{Y_i}}\right)$
21:  
   $\pi \leftarrow \frac{1}{\alpha}\left(\pi_1, \ldots, \pi_{i-1}, \frac{B_{A_1}}{B_{Y_i}}\pi_i, \frac{B_{A_2}}{B_{Y_i}}\pi_i, \pi_{i+1}, \ldots, \pi_{|S+1|}\right)$

---

Line 1 of Adaptive Rejection Sampling Algorithm #1 initializes the number of Accepts and of Rejects to 0. Line 2 initializes the partition S to the list (X) (that is, to the entire space or domain 22). Line 3 initializes the partition member selection probability vector π to the list (1) (in other words, sets the partition member selection probability for the single partition member defined in line 2 to unity). On line 4, $B_X$ is initialized to a nonnegative number and the probability measure $\overline{q}_X$ is initialized (for example, to the initial or reference normalized proposal distribution 26 in FIG. 1), thus forming an initial bounding pair $(B_X, \overline{q}_X)$. It is known how to sample from the normalized proposal distribution $\bar{q}_X$, and it is known that the measure $\bar{q}_X = B_X \bar{q}_X$ dominates p (that is, $q_X = B_X \bar{q}_X$ is an upper bound on the target distribution p).

On line 5, an infinite loop is entered which produces an infinite stream of samples from p. (The infinite loop established by the "while TRUE do" pseudocode of line 5 is merely an illustrative example, can be replaced by a finite loop having a desired termination—for example, line 5 can be replaced by "while Accepts <100 do" in order to acquire 100 samples in accordance with the normalized target distribution p). Lines 1-5 of Adaptive Rejection Sampling Algorithm #1 correspond to the initialization operation 30 of the diagrammatic representation shown in FIG. 2). The partition element selection operation 32 corresponds to lines 6 and 7 of Adaptive Rejection Sampling Algorithm #1. Lines 6 and 7 sample an index i according to the probability vector i, which selects an element $Y_i$ of the partition S. (Note, elsewhere herein the notation $Y_{sel}$ is used to denote the output of line 7). On line 8, $\bar{q}_{Y_i}$ is used to acquire a sample x (corresponding to sampling operation 34 of FIG. 2), and on lines 9-12 sample x is accepted with probability $$\frac{1}{B_{Y_i}} \frac{dp}{d\bar{q}_{Y_i}}(x)$$

(this number is less than 1 by construction of the bounding pair). Lines 9-10 correspond to the decision operation 36 of FIG. 2, while lines 11-12 correspond to the add operation 38 of FIG. 2). If the sample x is accepted, then the number of Accepts is increased by one in line 11 and the sample is "printed" in line 12. ("Printing" in this context encompasses any storage or use of the sample, such as being stored in the set of accepted samples 28 as per FIG. 2). If sample x is rejected, then the number of Rejects is updated by one (lines 13-14).

Lines 15-21 of Adaptive Rejection Sampling Algorithm #1 set forth the partition adaptation. Line 15 (corresponding to decision operation 40 of FIG. 2) decides whether or not to refine the partition. This decision can be based on various factors, such as the number of Accepts and Rejects thus far, whether the partition refinement stopping criterion has been met, or so forth. If line 15 decides to refine the partition, then lines 16-21 correspond to the partition refinement operation 42 of FIG. 2. In line 16, the selected partition member $Y_i$ (from which the last rejected sample was drawn) is split into two subsets (i.e., split partition member) $A_j, A_2$. In line 17, the partition S is updated to replace the selected partition member $Y_i$ with the split partition members $A_j, A_2$. In lines 18 and 19 new bounding pairs $(B_{A_1}, \bar{q}_{A_1})$ and $(B_{A_2}, \bar{q}_{A_2})$ are computed for split partition members $A_j$ and $A_2$, respectively. These bounding pairs are such that, for k=1,2: (i) it is known how to sample from $\bar{q}_{A_k}$; (ii) it is known how to compute $$\frac{1}{B_{A_k}} \frac{dp}{d\bar{q}_{A_k}}(x);$$

and (iii) $p^{(A_k)} \le B_{A_k} \bar{q}_{A_k}$, i.e, the measure $q_{A_k} = B_{A_k} \bar{q}_{A_k}$ dominates (or upper bounds) the target measure or distribution p over the partition member $A_k$. Furthermore it is ensured that $B_{A_k} \le B_{Y_i} \bar{q}_{Y_i}^{(A_k)}$, that is to say, the mass of $A_k$ relative to $q_{A_k}$ should be smaller than its mass relative to $q_{Y_i}$. The partition member selection probability vector π is updated in lines 20-21.

For a given partition S, the adaptive proposal distribution over the whole of X is $\bar{q}_S$, where $q_S = \Sigma_i q_{Y_i} = \Sigma_i B_{Y_i} \bar{q}_{Y_i}$. In order to sample from $\bar{q}_S$, a partition member $Y_i$ is first randomly selected according to the vector $$\pi \equiv \frac{1}{\alpha}(B_{Y_1}/B_S, \ldots, B_{Y_i}/B_S, B_{Y_{|S+1|}}/B_S),$$

where $B_S = \Sigma_i B_{Y_i}$ is the total mass of $q_S$ on X. Then, a sample x is randomly selected from the selected partition member $Y_i$ according to $\bar{q}_{Y_i}$. This is what lines 6-8 of Adaptive Rejection Sampling Algorithm #1 (or operations 32, 34 of FIG. 2) accomplish. Lines 9-10 accept sample x with probability $$\frac{dp}{dq_S}(x),$$

which for $x \in Y_i$, is equal to $$\frac{1}{B_{Y_i}} \frac{dp}{d\bar{q}_{Y_i}}(x).$$

The update of π on lines 20-21 of Adaptive Rejection Sampling Algorithm #1 operates as follows. For clarity, call S' and π' the values of the partition and of the probability vector after the split of partition member Y into split partition members $A_j$ and $A_2$. Before the split, for all $Y_j$ in S the following pertains: $\pi_j = B_{Y_j}/B_S$, with $B_S = \Sigma_j B_{Y_j}$. After the split, $\pi'_j = B_{Y_j}/B_{S'}$, for all j≠i, with $B_{S'} = B_{A_1} + B_{A_2} + \Sigma_{j \ne i} B_{Y_j} = B_S - (B_{Y_i} - (B_{A_1} + B_{A_2}))$. Further, $\pi'_{A_k} = B_{A_k}/B_{S'}$. Then, by defining $\alpha \equiv B_S/B_{S'}$ it follows that $$\alpha = 1 - \frac{B_{Y_i}}{B_S}\left(1 - \left(\frac{B_{A_1} + B_{A_2}}{B_{Y_i}}\right)\right) = 1 - \pi_i\left(1 - \left(\frac{B_{A_1} + B_{A_2}}{B_{Y_i}}\right)\right),$$

which is the form shown on line 20. Thus, for j≠i, $\pi'_j/\pi_j = B_S/B_{S'} = \alpha^{-1}$, and also, for k=1,2, $$\pi'_{A_k}/\pi_i = \frac{B_{A_k} B_S}{B_{Y_i} B_{S'}} = \alpha^{-1} \frac{B_{A_k}}{B_{Y_i}},$$

which is the form shown on line 21.

In Adaptive Rejection Sampling Algorithm #1, the partition S is suitably represented by the leaves of a tree corresponding to the different splits, which guarantees efficient selection (typically logarithmic in the number of leaves) of a given leaf on line 6. As already noted, on line 15 a partition refinement stopping criterion may be incorporated in order to stop all further refinements after a certain empirical acceptance rate has been reached. Such a partition refinement stopping criterion can avoid the storage and computation costs incurred by indefinitely refining the tree, albeit at the cost of having no further improvement thereafter in terms of observed acceptance rates.

In some embodiments of Adaptive Rejection Sampling Algorithm #1, the function BoundingPair( ) which obtains the bounding pairs $(B_{Y_i}, \bar{q}_{Y_i})$ utilizes the initial (or reference) normalized proposal distribution $\bar{q} = \bar{q}_X$ 26 to construct the normalized proposal distributions $\bar{q}_{Y_i}$ associated with respective partition elements $Y_i$ by renormalizing over the partition $Y_i$, that is, $\bar{q}_{Y_i} = \bar{q}(\bullet|Y_i)$. The approach starts with an initial bounding pair $(B_X, \bar{q}_X)$ defined over the whole space or domain X 22. This pair corresponds to conventional rejection sampling for a target (unnormalized) distribution p, with proposal distribution $\bar{q}$ and upper bound $B_X$ over all the density ratios $$\frac{dp}{d\bar{q}}(x),$$

for x∈X. The notations $q \equiv q_X$, $\bar{q} \equiv \bar{q}_X$, $\beta(X) \equiv B_X$, is used, and $\bar{q}$ is the reference proposal distribution 26, and $$\frac{dp}{d\bar{q}}(x)$$

is the reference density ratio at x. Further consider a measurable subset Y of X. It is known that β(X) is an upper bound for the density ratios $p(x)/\bar{q}_X(x)$ over Y, because it is an upper bound over the whole of X. In many cases, however, a priori knowledge of the smaller set Y can be used to determine a tighter bound β(Y)≤β(X) for the reference density ratio relative to Y: ∀x∈Y, $$\frac{dp}{d\bar{q}}(x) \leq \beta(Y).$$

Now define the measure $q_Y \equiv \beta(Y)\bar{q}$ over Y. It follows that $q_Y(Y) = \beta(Y)\bar{q}(Y)$ and $\bar{q}_Y(A) = \bar{q}(A|Y)$ (for A⊂Y, A measurable). Also, $$p(A) = \int_A \frac{dp}{d\bar{q}}(x) d\bar{q}(x) \leq q_Y(A).$$

In other words, the pair $(B_Y, \bar{q}_Y(\bullet)) \equiv (\beta(Y), \bar{q}(\bullet|Y))$ is a bounding pair for Y. Furthermore, a sampler for $\bar{q}_Y$ is simply obtained by conditioning (i.e., normalizing) the sampler for $\bar{q}$ relative to Y. Suppose now that Y' is a measurable subset included in Y, for which an even tighter density bound β(Y')≤β(Y) can be determined. Then, in the same way as before, the bounding pair $(B_{Y'}, \bar{q}_{Y'}(\bullet))$ is obtained. Furthermore, for A⊂Y', it follows that $q_{Y'}(A) = \beta(Y')\bar{q}(A) \leq \beta(Y)\bar{q}(A) = q_Y(A)$, and therefore $q_{Y'}$ is dominated by $q_Y$ over X, or in other words the bounding pair $(B_{Y'}, \bar{q}_{Y'}(\bullet))$ is tighter than the bounding pair $(B_Y, \bar{q}_Y(\bullet))$.

Figure 7:
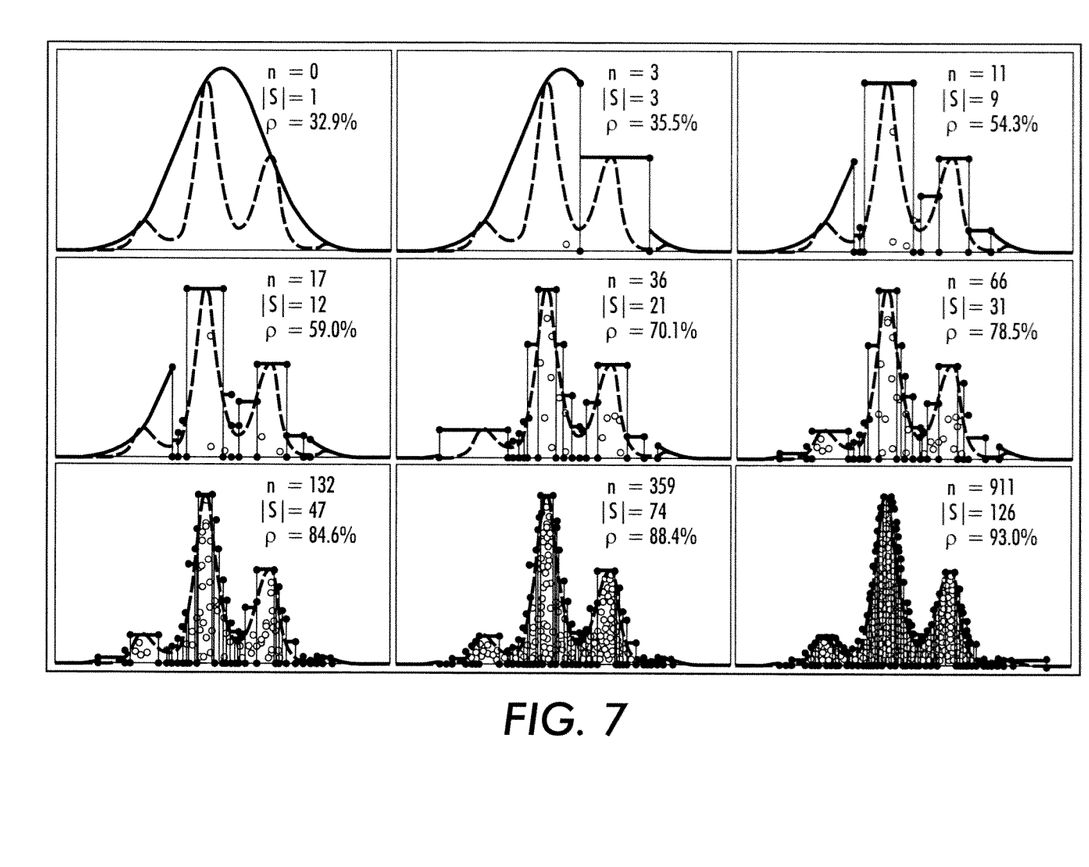
FIG. 7 plots nine states of the rejection sampling performed by the sampling module of FIGS. 1 and 2, in which the partition is adapted to include progressively larger numbers of partition elements with generally closer associated bounds and generally improved proposal distributions.

With reference to FIG. 7, Adaptive Rejection Sampling Algorithm #1 with the foregoing bounding pair computation is applied for the sampling of a one-dimensional distribution (shown in a dashed line in FIG. 7), with density proportional to $f(x) = e - \sin(4x) - \frac{1}{2}x^2$. The partition $\{-\infty, x_1, x_2, \ldots, x_n, \infty\}$ of the real line is obtained by using the sorted values of the rejected samples $x_1, \ldots, x_n$. The bounding pair defined on the i-th segment $Y_i = [x_i, x_{i+1}]$ is the uniform distribution $$q(z) = \frac{1}{x_{i+1} - x_i} I\{z \in Y_i\}$$

associated with the supremum of the function on this interval, i.e. $\beta(Y_i) = \sup_{z \in Y_i} f(z)$. FIG. 7 shows nine plots illustrating different states of Adaptive Rejection Sampling Algorithm #1 when sampling a non-trivial multimodal distribution. The solid line in each plot shows the bounds $q_{Y_i} = B_{Y_i} \bar{q}_{Y_i}$ for the partition members $Y_i$. The legends inside each plot indicate the number of sampled points n, the cardinality |S| of the partition S of the real line, and the exact acceptance rate p computed numerically.

For partition S of domain X being a refinement obtained at a given stage of the partition adaptation, denote as the measure $q_S = \Sigma_{Y_i \in S} q_{Y_i}$ the proposal distribution associated with the refinement S. By construction of the bounding pairs $(B_{Y_i}, \bar{q}_{Y_i})$ it follows that p≤$q_S$. Now consider a fixed partition S, and assume that no further refinement of S takes place on line 14 of Adaptive Rejection Sampling Algorithm #1. Denote as γ the probability that in one sampling iteration (i.e., one pass of the while loop at line 5) an Accept is obtained, and call γ the expected Acceptance Rate of the algorithm relative to S. Suppose that, with S fixed, n sampling iterations are performed. Denote by $\hat{\gamma}$ the random variable corresponding to the observed proportion of Accepts relative to n, and call $\hat{\gamma}$ the observed acceptance rate on n runs of the algorithm relative to S. Further, the notation Z=p(X) is used for the (fixed once and for all, but unknown) partition function of p on X, and denote by $\hat{Z}$ the random variable $\hat{Z} \equiv \hat{\gamma} q_S(X)$. Then, Lemma 1 pertains: $\gamma = p(X)/q_S(X)$ and mean($\hat{\gamma}$)=γ and var($\hat{\gamma}$)=$n^{-1}\gamma(1-\gamma)$ and mean($\hat{Z}$)=Z=p(X) and $$\text{var}(\hat{Z}) = n^{-1} \frac{1-\gamma}{\gamma} Z^2.$$

Lemma 1 is obtained as a consequence of the definition of rejection sampling. Lemma 1 shows that, for a fixed number of trials n, the estimate for the partition function Z=p(X) has a precision which varies with (1−γ)/γ, that is, is poor for small acceptance rates, and good for high acceptance rates. Thus, for a fixed level of refinement S, and with $q_S$ its associated proposal distribution, the expected acceptance rate γ is equal to $p(X)/q_S(X)$. Each time a refinement step (lines 16-20) is performed, $q_S$ can only decrease, and therefore γ can only increase. Then, the following conditions on Adaptive Rejection Sampling Algorithm #1 guarantee that γ can reach, in the limit, an arbitrarily high acceptance level $\hat{\gamma}$≤1, a property called γ-convergence herein.

The following assumes q is the fixed reference proposal measure 26, and the abbreviation f is used here for the density function dp/d$\bar{q}$. It is further assumed that the refinement at line 14 is performed after each sample rejection. Then, if $Y_i$ is a partition element of the partition S and $Y_i$ has depth d iff d is the number of splits that has led to $Y_i$, where the depth of X is taken as 0. If $Y_i$ is a measurable subset of X, $\beta_i = \beta(Y_i)$ is an upper bound for $$f(x) = \frac{dp}{d\bar{q}}(x)$$

on $Y_i$, and ϵ is a nonnegative number, we will say that $Y_i$ is ϵ-tight if $\beta_i - f(x) \leq \epsilon$ a. e. wrtq on $Y_i$. Note in particular that $q(Y_i)=0$ implies that $Y_i$ is 0-tight, because of the 'a.e.' qualification. This leads to Lemma 2: For any depth d, there exists a time t such that, for all $Y_i \in S_t$, one has: depth($Y_i$)≥d or $Y_i$ is 0-tight. The algorithm respects Condition 1 iff, for any $\epsilon_1$, $\epsilon_2 > 0$, there exists (with probability 1) a finite time t such that, with $S_t$ the current refinement at time t, the total q-measure of those $Y_i \in S_t$ which are not $\epsilon_1$-tight is less or equal to $\epsilon_2$. In other words, this condition says that, with time passing, the q-measure of the union of those elements $Y_i$ of $S_t$ for which $\beta_i$ tightly approximates the density dp/d$\bar{q}$ converges to the total measure q(X). It can then be shown that if p(X)>0 and if Condition 1 holds, then γ-convergence is obtained.

The illustrative example of sampling in accordance with an augmented PCFG (that is, a PCFG with transversal constraints) is one in which γ-convergence can be achieved. Consider all the finite derivation (i.e. parse) trees x defined by a certain PCFG $G_0$ (all the leaves of x are terminals of the grammar), and assign to each x its PCFG probability q(x), i.e. the product of the conditional probabilities of the rules used for producing x. Assume further that the PCFG $G_0$ is normalized in that the sum of the probabilities of all finite derivations is 1. Consider now the following augmentation G of $G_0$: the grammar G has the same rules and derivations as $G_0$, but the score p(x) of a finite derivation x is defined as the product of q(x) and of a "transversal constraint" term f(x) which lies in the interval [0,1]. Such a term may be useful for representing different things—such as for instance the quality of the linguistic agreements between different words in the derivation, where perhaps we want to discourage a singular subject to be associated with a plural verb, without completely forbidding it.

Suppose now that it is desired to sample derivations according to the target (unnormalized) distribution p(x). The equality $\bar{q}=q$ can be used (this equality holds because q is already normalized by construction) as the initial (or reference) proposal distribution, and then the density function of p relative to q is $$f(x) = \frac{dp}{d\bar{q}}(x) = p(x)/\bar{q}(x).$$

Further consider the following adaptive rejection sampling algorithm with G: each Y corresponds to a complete or partial derivation tree in the grammar; if a $\bar{q}$-trial lands below a partial $Y_i$ but is then rejected, then $Y_i$ is expanded by selecting one of the nonterminals on its frontier and producing new partial derivations corresponding to the different possible expansions of this nonterminal. In general, enough a priori knowledge may be available to find a non-trivial bound $\beta(Y_i) \leq 1$ for f(x), for all x's below the partial derivation $Y_i$. At the least it may be expected that if $Y_i$ corresponds to a complete derivation x, it is always possible to compute the optimal bound, namely $\beta(Y_i)=f(x)$ (for which $Y_i$ is then 0-tight). Thus, Condition 1 holds, and γ-convergence is obtainable.

The adaptive rejection sampling approaches disclosed herein have been applied to the problem of sampling Ising (or spin-glass) models. These models are studied in the physics literature are a special case of undirected probabilistic graphical models. Given a graph $G=(\mathcal{N}, \mathcal{G})$ containing $n=\mathcal{N}$ nodes and a set of edges $\mathcal{E}$ encoding pairwise interactions, Ising models are defined on $X=-1,1^n$ with a density proportional to $e^{f(x)}$ where $$f(x) = -\frac{1}{2}\left\{\sum_{i=1}^{n} u_i x_i + \frac{1}{2}\sum_{(i,j)\in\varepsilon} v_{ij} x_i x_j\right\}.$$

The parameters $u_i \in \mathfrak{R}$, i=1, ..., n and $v_{ij} \in \mathfrak{R}$, $(i,j) \in \mathcal{G}$ are assumed to be known. To sample an Ising model using the disclosed adaptive rejection sampling approach, we used the cutset conditioning idea: conditioned on the value of a variable, say $x_i$, the sampling of the remaining variables $x_{-i}$ is slightly simpler, since this has the effect of removing all the edges that are connected to i. Hence, the split operations correspond to choosing an index i of a variable highly connected, and to use an upper bound to the log-partition function of the Ising model with the variable i removed. To obtain local upper bounds on the conditional distributions, we use a minimal energy spanning tree on the unknown variables and set the non-covered edges to the maximal possible value of the interaction.

Figure 8:
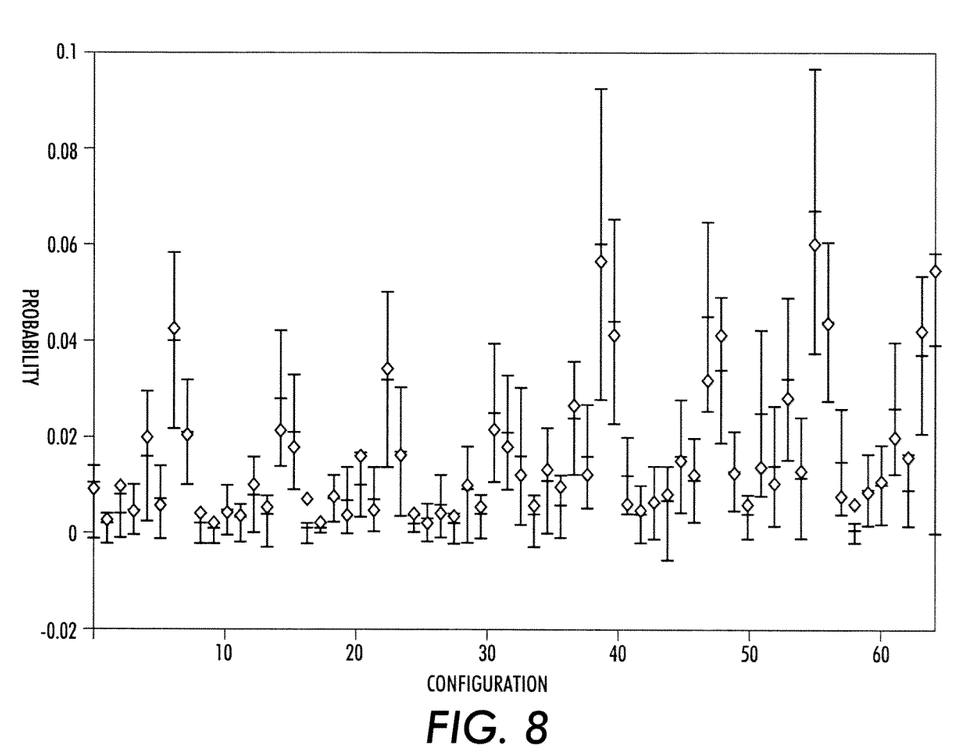
FIGS. 8 and 9 plot experimental results as set forth herein.

With reference to FIG. 8, the x-coordinate correspond to a configuration in a random graph with 6 nodes and 20 edges. The y-axis is the probability of the corresponding configuration. The red diamonds are the exact probabilities and the error bar represent the means of 100 samples of size 1000. The height correspond to the standard deviation around these averages. This shows that the adaptive rejection sampling as disclosed herein gives unbiased estimates of the marginals. We ran the experiments on 10, 15 and 20 nodes, using random graphs having respectively 50, 76 and 107 random edges.

Figure 9:
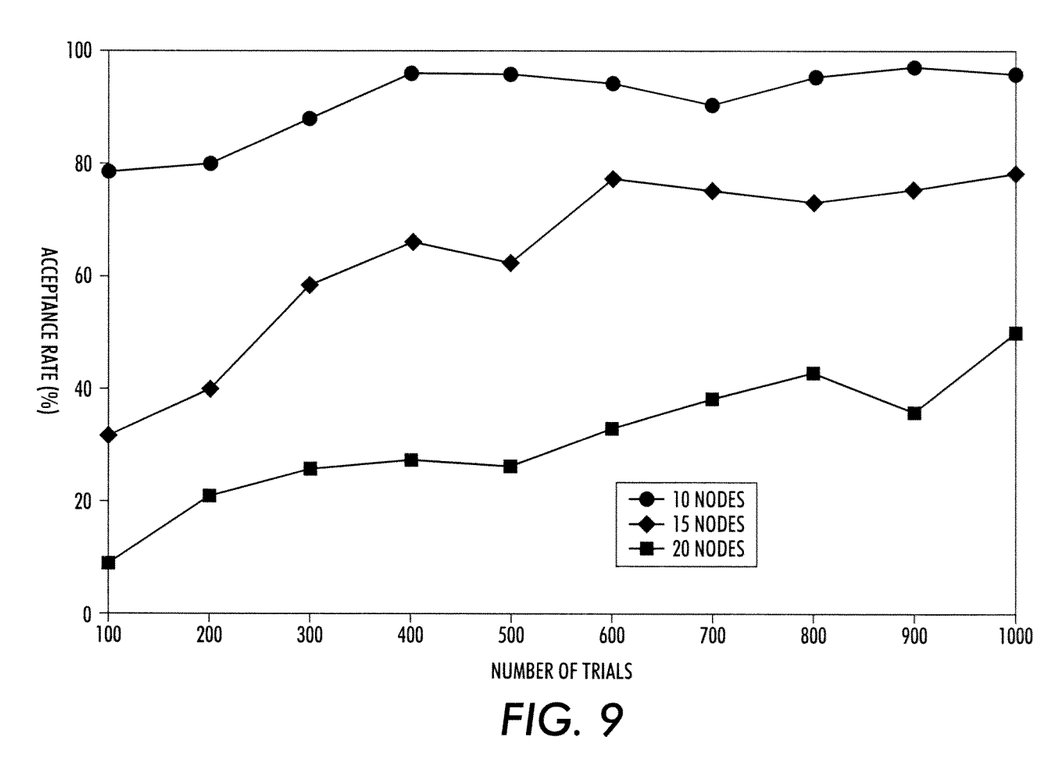

With reference to FIG. 9, we plot the acceptance rate of the adaptive rejection sampling algorithm as a function of the number of trials already done. As expected, we see that the ARS acceptance rate increases as the number of iteration increases.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
performing iterative rejection sampling on a domain in accordance with a target distribution wherein the domain is partitioned to define a partition comprising partition elements and wherein each iteration of the rejection sampling includes selecting a partition element from the partition in accordance with partition element selection probabilities, acquiring a sample of the domain in the selected partition element according to a normalized proposal distribution that is associated with and normalized over the selected partition element, and accepting or rejecting the acquired sample based on the target distribution and a bound associated with the selected partition element; and
during the iterative rejection sampling, adapting the partition by replacing a partition element of the partition with two or more split partition elements, associating bounds with the split partition elements, and computing partition element selection probabilities for the split partition elements;
wherein the performing of iterative rejection sampling and the adapting of the partition is performed by an electronic processing device.

2. The method of claim 1, wherein:
normalized proposal distributions $\bar{q}(\cdot|Y_i)$ are associated with respective partition elements $Y_i$ of the partition where q is a reference proposal distribution normalized over the partition and $\bar{q}(\cdot|Y_i)$ is normalized over partition element $Y_i$, and
bounds $Q_{Y_i}=B_{Y_i}\bar{q}_{Y_i}$ are associated with respective partition elements $Y_i$ of the partition where $B_{Y_i}$ is a nonnegative scaling factor associated with the partition element $Y_i$.

3. The method of claim 2, wherein the reference proposal distribution $\bar{q}$ normalized over the partition comprises a probabilistic context-free grammar (PCFG), the domain comprises all finite parsing trees defined by the PCFG for an input natural language sentence, and the target distribution comprises the PCFG with at least one transversal constraint.

4. The method of claim 1, wherein the accepting or rejecting employs an acceptance criterion $$u \le \frac{dp}{dQ_{Y_i}}(x)$$

where p denotes the target distribution, $Q_{Y_i}$ denotes the bound associated with the selected partition element $Y_i$, and u denotes a value drawn from a uniform distribution [0,1].

5. The method of claim 1, wherein the adapting is performed responsive to rejection of a sample acquired from a selected partition element $Y_{sel}$ during the iterative rejection sampling and the adapting replaces the selected partition element $Y_{sel}$ from which the sample was acquired with the two or more split partition elements $A_j$, $j=1, \ldots, N$ where $N \ge 2$ and $Y_{sel} = U_{j=1}^{N} A_j$.

6. The method of claim 5, wherein:
normalized proposal distributions $\bar{q}_{Y_i}$ are associated with respective partition elements $Y_i$ of the partition where $\bar{q}_{Y_i}$ is normalized over the partition element $Y_i$,
bounds $Q_{Y_i} = B_{Y_i} \bar{q}_{Y_i}$ are associated with respective partition elements $Y_i$ of the partition where $B_{Y_i}$ is a nonnegative scaling factor associated with the partition element $Y_i$; and
the associating of bounds with the split partition elements comprises associating bounds $Q_{A_j} = B_{A_j} \bar{q}_{A_j}$ with respective split partition elements $A_j$ where $\bar{q}_{A_j}$ is a distribution normalized over the split partition element $A_j$.

7. The method of claim 6, wherein the computing of partition element selection probabilities for the split partition elements comprises computing partition element selection probabilities proportional to $$\frac{B_{A_j}}{B_{Y_{sel}}} \pi_{sel}$$

for respective split partition elements $A_j$ where $\pi_{sel}$ is the partition element selection probability for the selected partition element $Y_{sel}$.

8. The method of claim 6, wherein:
the normalized proposal distributions $\bar{q}_{Y_i}$ associated with respective partition elements $Y_i$ of the partition comprise $\bar{q}_{Y_i} = \bar{q}(\cdot|Y_i)$; and
the distributions $\bar{q}_{A_j}$ normalized over respective split partition elements $A_j$ comprise $\bar{q}_{A_j} = \bar{q}(\cdot|A_j)$;
where $\bar{q}$ is a reference proposal distribution normalized over the partition.

9. The method of claim 1, wherein the target distribution comprises a discrete target distribution.

10. An electronic processing device configured to perform a method as set forth in claim 1.

11. A storage medium storing instructions that when executed by an electronic processing device perform a method as set forth in claim 1.

12. A non-transitory storage medium storing instructions executable by an electronic processing device to perform a method including performing iterative rejection sampling of a domain in accordance with a target distribution p wherein the domain is partitioned into a partition comprising partition elements $Y_i$ each having an associated selection probability $\pi_i$ and an associated normalized proposal distribution $\bar{q}_{Y_i}$ that is normalized over the partition element $Y_i$ and an associated bound $Q_{Y_i} = B_{Y_i}$ where $B_{Y_i}$ is a nonnegative scaling factor, wherein at least one iteration of the iterative rejection sampling is performed by:
selecting a partition element $Y_{sel}$ of the partition in accordance with the selection probabilities $\pi_i$,
obtaining a sample x of the domain in the selected partition element $Y_{sel}$ in accordance with the normalized proposal distribution $\bar{q}_{Y_{sel}}$ associated with the selected partition element $Y_{sel}$ and accepting or rejecting the sample x based on an acceptance criterion $$u \le \frac{dp}{dQ_{Y_{sel}}}(x)$$

wherein (i) accepting the sample comprises adding the sample to a set of accepted samples and (ii) rejecting the sample comprises replacing the selected partition element $Y_{sel}$ with split partition elements $A_j$, $j=1, \ldots, N$ where $N \ge 2$ and $Y_{sel} = U_{j=1}^{N} A_j$.

13. The non-transitory storage medium as set forth in claim 12, wherein rejecting the sample further comprises:
associating bounds $Q_{A_j} = B_{A_j} \bar{q}_{A_j}$ with respective split partition elements $A_j$ where $\bar{q}_{A_j}$ is a normalized proposal distribution associated with and normalized over the split partition element $A_j$.

14. The non-transitory storage medium of claim 13, wherein rejecting the sample further comprises:
computing partition element selection probabilities $$\pi_{A_j} \propto \frac{B_{A_j}}{B_{Y_{sel}}} \pi_{sel}$$

for respective split partition elements $A_j$ where $\pi_{sel}$ is the partition element selection probability for the selected partition element $Y_{sel}$.

15. The non-transitory storage medium of claim 13, wherein:
the normalized proposal distributions $\bar{q}_{A_j}$ associated with respective partition elements $Y_i$ of the partition comprise $\bar{q}_{Y_i} = \bar{q}(\cdot|Y_i)$; and
the distributions $\bar{q}_{A_j}$ normalized over respective split partition elements $A_j$ comprise $\bar{q}_{A_j} = \bar{q}(\cdot|Y_i)$;
where $\bar{q}$ is a reference proposal distribution normalized over the partition.

16. The non-transitory storage medium of claim 13, wherein the normalized distributions $\bar{q}_{Y_i}$ and $\bar{q}_{A_j}$ are discrete distributions.

17. The non-transitory storage medium of claim 13, wherein the normalized distributions $\bar{q}_{Y_i}$ and $\bar{q}_{A_j}$ are multi-dimensional distributions.

18. An apparatus comprising:
an electronic processing device configured to:
partition a domain into one or more partition elements $Y_i$ each having an associated selection probability $\pi_i$ and an associated normalized proposal distribution $\bar{q}_{Y_i}$ that is normalized over the partition element $Y_i$ and an associated bound $Q_{Y_i} = B_{Y_i} \bar{q}_{Y_i}$ where $B_{Y_i}$ is a nonnegative scaling factor;
iteratively sample the domain in accordance with a target distribution p wherein each iteration includes selecting a partition element $Y_{sel}$ in accordance with the selection probabilities $\pi_i$, acquiring a sample x from the domain within the selected partition element $Y_{sel}$ in accordance with the normalized proposal distribution $\bar{q}_{Y_{sel}}$ associated with the selected partition element $Y_{sel}$ and accepting or rejecting the acquired sample x based on the target distribution p and the bound $Q_{Y_{sel}} = B_{Y_{sel}} \bar{q}_{Y_{sel}}$ associated with the selected partition element $Y_{sel}$; and
during the iterative sampling, replace a partition element $Y_r$ with split partition elements $A_j$, $j=1, \ldots, N$ where $N \ge 2$ and $Y_r = U_{j=1}^{N} A_j$ the iterative sampling continuing after the replacement.

19. The apparatus as set forth in claim 18, wherein the adaptation is triggered by rejection of a sample x acquired from a selected partition element $Y_{sel}$ and the replaced partition element $Y_r$ is the selected partition element $Y_{sel}$.

20. The apparatus as set forth in claim 18, wherein the adaptation further comprises:
  associating bounds $Q_{A_j} = B_{A_j} \bar{q}_{A_j}$ with respective split partition elements $A_j$ where $\bar{q}_{A_j}$ is a normalized proposal distribution associated with and normalized over the split partition element $A_j$.

21. The apparatus as set forth in claim 20, wherein the adaptation further comprises:
  computing partition element selection probabilities $$\pi_{A_j} \propto \frac{B_{A_j}}{B_{Y_r}} \pi_r$$

for respective split partition elements $A_j$ where $\pi_r$ is the partition element selection probability for the replaced partition element $Y_r$.

22. The apparatus as set forth in claim 20, wherein:
  the normalized proposal distributions $\bar{q}_{Y_i}$ associated with respective partition elements $Y_i$ comprise $\bar{q}_{Y_i} = \bar{q}(\bullet | Y_i)$; and
  the distributions $\bar{q}_{A_j}$ normalized over respective split partition elements $A_j$ comprise $\bar{q}_{A_j} = \bar{q}(\bullet | Y_i)$;
  where $\bar{q}$ is a reference proposal distribution normalized over the domain.

23. The apparatus as set forth in claim 18, wherein the domain is a discrete domain and the normalized proposal distributions $\bar{q}_{Y_i}$ associated with respective partition elements $Y_i$ are discrete distributions.

24. The apparatus as set forth in claim 18, wherein the domain is a multi-dimensional domain and the normalized proposal distributions $\bar{q}_{Y_i}$ associated with respective partition elements $Y_i$ are multi-dimensional distributions.

* * * * *